United States Patent Office 3,776,908
Patented Dec. 4, 1973

3,776,908
HETEROCYCLIC AMINE ESTERS OF 2-PHENYL
OR 2-PROPYL-4-PENTYNOIC ACID
Guido Cerbai, Via C. Loquez, 7 Pisa, Italy, and Luigi
Turbanti, Via B. Da Padule, 10 Pisa, Italy
No Drawing. Original application Aug. 6, 1968, Ser. No.
750,479, now Patent No. 3,687,955, dated Aug. 29,
1972. Divided and this application June 23, 1972, Ser.
No. 265,753
Claims priority, application Italy, Aug. 9, 1967,
19,363/67
Int. Cl. C07d 87/36
U.S. Cl. 260—247.2 B    1 Claim

ABSTRACT OF THE DISCLOSURE

A series of alkylamine esters and heterocyclic amine esters of 2-phenyl or 2-propyl-4-pentynoic acid are provided along with physiologically acceptable salts thereof. These compounds are effective therapeutic agents having antispasmodic action as well as a regulatory effect on gastric and intestinal hyperkinesia. The production of these compounds is also provided.

CROSS REFERENCE TO RELATED APPLICATIONS

This application is a divisional of our copending application Ser. No. 750,479, filed Aug. 6, 1968, now U.S. Pat. No. 3,687,955, granted on Aug. 29, 1972, for "The Tropine Ester of 2-Phenyl-4-Pentynoic Acid."

BACKGROUND OF THE INVENTION

This invention relates in general to amino-type esters of 2-phenyl-4-pentynoic acid and 2-propyl-4-pentynoic acid, as well as physiologically acceptable salts thereof and also to methods of manufacturing these compounds.

These compounds are new and have been found useful as therapeutic agent having a marked antispasmodic effect associated with a regulatory effect on gastric and intestinal hyperkinesia, an anti-ulcer activity.

SUMMARY OF THE INVENTION

Generally speaking, the compounds of the invention exhibit the following general formula:

$$HC\equiv C-CH_2$$
$$\phantom{HC\equiv C-}\diagdown$$
$$\phantom{HC\equiv C-CH}CH-C-O-R'$$
$$\phantom{HC\equiv C-}\diagup$$
$$\phantom{HC\equiv C-}R$$

wherein R= —$C_3H_7$ or —$C_6H_5$ and R' is a radical chosen from the group comprising:

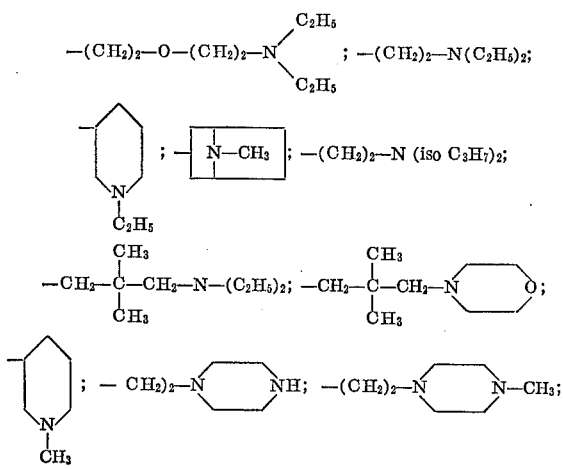

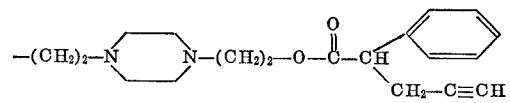

The invention also relates to salts of these basic esters with certain inorganic acids (hydrochloric, sulphuric, citric, maleic, tartaric acids) and to quaternization compounds of said basic esters with alkyl or alkylidene halides (such as $CH_3Br$, $C_2H_5Br$, $C_4H_9Br$) of the type $C_nH_mX$, wherein $C_nH_m$ represents a branched or linear aliphatic chain, saturated or unsaturated, with 1–10 carbon atoms, and X represents one atom of chlorine, bromine or iodine.

The preparation of the products to which the invention relates, involves the production of certain intermediates not known in the literature, in particular of 2-propyl-4-pentynoic acid and of the 2-phenyl-4-pentynoate of β-bromoethyl: 2-phenyl-4-pentynoic acid is however known. The preparation also involves the conversion of said products into the corresponding amino-esters by three different methods which also form part of the present invention. Finally, by a method known in the literature, the amino-esters may be converted into the corresponding products of salification and quaternization. One of the general methods of obtaining amino-esters, hereinafter called "method A," comprises the hot reaction in an organic solvent (benzol, toluol, xylol) of the chloride of 2-phenyl- or 2-propyl-4-pentynoic acid with the potassium or sodium salts of an amino-alcohol chosen from the following:

2-diethyl-amino-ethanol;
N-ethyl-3-hyroxy-piperidine;
tropine;
2-diisopropyl-aminoethanol;
N-methyl-3-hydroxy-piperidine;
3 (N-morpholine)-2,2-dimethyl-propanol;
3-diethyl-amino-2,2-dimethyl-propanol;
N-methyl-N-(2-hydroxy-ethyl)-piperazine.
N,N-bis-(2-hydroxyethyl)-piperazine;
2-(2'-diethylaminoethoxy)-ethanol.

Another general method, indicated as "method B," comprises the hot reaction in a polar solvent of the alkaline salt of 2-phenyl- or 2-propyl-4-pentynoic acid with an amino-alkyl-halide chosen from the group comprising:

2 diethylamino ethyl chloride;
N-ethyl-3-chloro-piperidine;
2 di-isopropylamino-ethyl-chloride;
N-methyl-3-chloro-piperidine;
3 (N-morpholine)-2,2-dimethyl-propyl-chloride;
3-di-ethylamino-2,2-dimethyl-propyl-chloride;
N-methyl-N'-(-2-chloro ethyl)piperazine;
N,N'-bis-(2-chloro ethyl)piperazine;

A third method, indicated as "method C" comprises the reaction under pressure of the bromo-alkyl-ester of 2-phenyl or 2-propyl-4-pentynoic acid with a compound chosen from the group: diethylamine; di-isopropylamine; piperazine; N-methylpiperazine; morpholine and diethylaminoethanol.

The antispasmodic effect was determined on segments of various isolated organs, and it was noted that most of the experimental products inhibit or prevent the contractions due to the use of spasmogenics of a hormonal, humoral or other nature. With some of the experimental compounds, this inhibitory or preventative activity was found even at concentration of $1\times10^{-5}$ and $1\times10^{-7}$.

The antispasmodic activity of the compounds of the invention is illustrated in the following table which gives in terms of concentration the $ED_{50}$ inhibiting the spasm of isolated organs (terminal ileum of a guinea-pig, ascending colon of rat, rat jejunum, rat uterus), the spasm being produced by certain spasmogenic agents such as histamine (HIST), 5 - hydroxy - triptamine (5HT), acetylcholine (ACH), barium chloride, oxytocin, and plasmatic bradychinine (SRS). Together with certain products of the invention, listed by numerical reference but whose formulae will be defined below, the table gives by way of comparison some commercial antispasmodics. The corresponding $ED_{50}$ values show that the new compounds can be advantageously compared with the latter.

TABLE OF $ED_{50}$ VALUES EXPRESSED IN GM./ML. OF BATH (SPASMOGENIC MATERIALS)

| | ACH | | BACl | | SHT, 1 μg./ml. | Histamine, 0.01 0.01 μg./ml. | Oxytocin, 0.01 0.01 μg./ml. | SRS, 0.1 0.1 μg./ml. |
|---|---|---|---|---|---|---|---|---|
| | 0.15 μg./ml. inhibiting | 0.15 μg./ml. relaxing | 10 μg./ml. relaxing | 250 μg./ml. | | | | |
| 50229 | $1\times10^{-6}$ | $2.8\times10^{-7}$ | $8\times10^{-5}$ | $2.3\times10^{-5}$ | $5\times10^{-5}$ | $7.5\times10^{-7}$ | $5\times10^{-5}$ | $2.5\times10^{-4}$ |
| 50268 | $1\times10^{-6}$ | $5\times10^{-7}$ | $2.5\times10^{-5}$ | $1.3\times10^{-6}$ | $3\times10^{-5}$ | $1.2\times10^{-6}$ | $1.2\times10^{-4}$ | $2.5\times10^{-4}$ |
| 50304 | $1.2\times10^{-7}$ | $8.5\times10^{-6}$ | $3\times10^{-5}$ | $3.5\times10^{-6}$ | $4\times10^{-5}$ | $4\times10^{-5}$ | $7.5\times10^{-5}$ | $9/10^{-5}$ |
| 50302 | $3\times10^{-6}$ | $7.5\times10^{-7}$ | $6.5\times10^{-6}$ | $1.1\times10^{-6}$ | $2\times10^{-5}$ | $2.5\times10^{-6}$ | $2.7\times10^{-5}$ | $3\times10^{-5}$ |
| 50276 | $2.3\times10^{-6}$ | $6\times10^{-7}$ | $2.3\times10^{-5}$ | $2.5\times10^{-6}$ | $1.2\times10^{-6}$ | $2.5\times10^{-6}$ | $2.5\times10^{-4}$ | $2.5\times10^{-4}$ |
| 50307 | $1.1\times10^{-6}$ | $8\times10^{-7}$ | $5\times10^{-6}$ | $1.1\times10^{-5}$ | $2\times10^{-5}$ | $6\times10^{-6}$ | $6\times10^{-5}$ | $8.5\times10^{-5}$ |
| 50303 | $6.5\times10^{-7}$ | $4\times10^{-6}$ | $1.2\times10^{-6}$ | $7.5\times10^{-6}$ | $2.5\times10^{-5}$ | $7.7\times10^{-5}$ | $8\times10^{-5}$ | $8\times10^{-5}$ |
| 50303MJ | $1\times10^{-7}$ | $1.2\times10^{-6}$ | $5\times10^{-7}$ | $<1\times10^{-4}$ | $1\times10^{-4}$ | $4.5\times10^{-6}$ | $7.5\times10^{-4}$ | $3\times10^{-3}$ |
| 50314 | $8\times10^{-6}$ | $6.5\times10^{-7}$ | $1.1\times10^{-5}$ | $4\times10^{-5}$ | $8\times10^{-5}$ | $2.5\times10^{-5}$ | $1.1\times10^{-4}$ | $1.2\times10^{-4}$ |
| 50321 | $7\times10^{-6}$ | $7.5\times10^{-6}$ | $2.7\times10^{-5}$ | $<1\times10^{-4}$ | $5.5\times10^{-6}$ | $4\times10^{-5}$ | $1.2\times10^{-4}$ | $2.5\times10^{-4}$ |
| 50315 | $8\times10^{-6}$ | $2.5\times10^{-6}$ | $7.5\times10^{-6}$ | $1\times10^{-5}$ | $7.5\times10^{-5}$ | $5\times10^{-5}$ | $2.8\times10^{-5}$ | $2.5\times10^{-5}$ |
| Atropine | $2.3\times10^{-8}$ | $3\times10^{-8}$ | $2.5\times10^{-8}$ | $<1\times10^{-5}$ | $5.5\times10^{-5}$ | $5\times10^{-5}$ | $1\times10^{-2}$ | $3.5\times10^{-3}$ |
| Deserril | $7.8\times10^{-7}$ | $1.2\times10^{-5}$ | $3.8\times10^{-5}$ | $1.2\times10^{-5}$ | $1.1\times10^{-6}$ | $<1\times10^{-5}$ | $5\times10^{-5}$ | $1.2\times10^{-5}$ |
| Antistin | $3.5\times10^{-6}$ | $5\times10^{-6}$ | $4.4\times10^{-5}$ | $1.1\times10^{-6}$ | $1.2\times10^{-5}$ | $2.5\times10^{-5}$ | $1\times10^{-4}$ | $2.3\times10^{-3}$ |
| Buscopan | $1\times10^{-6}$ | $2.8\times10^{-7}$ | $5\times10^{-6}$ | $1\times10^{-5}$ | $1\times10^{-5}$ | $7.8\times10^{-5}$ | $3.5\times10^{-4}$ | $5.5\times10^{-4}$ |
| Spasmamide | $5\times10^{-6}$ | $4.2\times10^{-6}$ | $1.1\times10^{-5}$ | $2.5\times10^{-5}$ | $3.2\times10^{-5}$ | $2\times10^{-5}$ | $2.5\times10^{-5}$ | $5.5\times10^{-5}$ |
| Papaverina | $5\times10^{-6}$ | $1.1\times10^{-6}$ | $1.2\times10^{-5}$ | $2.5\times10^{-5}$ | $1.1\times10^{-5}$ | $7.5\times10^{-6}$ | $3.5\times10^{-5}$ | $1\times10^{-5}$ |
| Gemora | $2.3\times10^{-6}$ | $2\times10^{-9}$ | $1.2\times10^{-5}$ | $5\times10^{-5}$ | $1.1\times10^{-5}$ | $1.7\times10^{-6}$ | $2.5\times10^{-5}$ | $2.4\times10^{-5}$ |
| Cantil | $1\times10^{-8}$ | $8\times10^{-9}$ | $1\times110^{-4}$ | $<1\times10^{-4}$ | $<1\times10^{-4}$ | $3.5\times10^{-7}$ | $1.3\times10^{-5}$ | $1.8\times10^{-3}$ |

NOTE.—Deserril=Methylsergide. Antistin=Antazoline phosphate. Cantil=Mepenzolate bromide (I.C.D.=3-hydroxy-1,1 dimethyl piperidinium bromide benzilate). Gemora=Butaverine (I.C.D.=Butyl-3-phenyl-3(1-piperidyl) priolonate). Spasmamade=Phenamid=N[2-(diethylamino)ethyl] amide of ethyl ester of ethyl:phenyl-malonic acid. Buscopan=Scopolamine-butyl bromide=N-butyl-scopolamonium bromide.

In general this large series of products is characterized by an endoperitoneal $DL_{50}$ for mica less than those of the various reference materials. In fact while the $DL_{50}$ of commercial products varies from 100–200 mg./kg., that of the products of the invention is about 300 mg./kg., which means the new products are appreciably less toxic than the various known products taken in comparison.

Anti-ulcerative activity was determined in numerous tests including histamine ulcers, contention ulcers, ulcers of the ligature of the pylorus. Some of the products were found to inhibit effectively ulcer formation, so they may be considered useful agents in gastric and duodenal ulcer therapy.

The pharmacological features and the collateral effects in practice overlap those of atropine, so that the products examined are indicated for the therapy of spasms in the smooth musculature of the biliary and urogenital tracts and of the digestive system as well as for anti-ulcerative agents. These therapeutic applications appear all the more advantageous when allowance is made for the higher therapeutic index of the new drugs as compared with that of atropine.

DESCRIPTION OF PREFERRED EMBODIMENTS

The following examples illustrate the preparation of novel intermediates such as 2-propyl-4-pentynoic acid and 2-phenyl-4-pentynoate of β-bromoethyl, together with details of the general methods A, B, C. These examples are followed by a list of the new products with their corresponding physical properties, and indications of their method of production.

EXAMPLE 1

Preparation of 2-propyl-4-pentynoic acid (R=—$(CH_2)_2$—$CH_3$ and R'=H)

To an ethanol solution of the sodium salt of ethyl propyl-aceto-acetate, obtained from 34.4 gm. of propyl acetoacetate (0.2 mol) and 4.6 gm. of sodium (0.2 mol) in 80 cc. of absolute ethanol, there is added in the cold and with stirring 26.16 gm. of propargyl bromide (0.22 mol). After being left overnight the solution is reflux heated for 3 hours, the inorganic salt formed is filtered off and the filtrate is evaporated to dryness. The residue is taken up with water, extracted with either, the combined ether extracts are dried and evaporated and the oily residue is fractionated to give 31.8 gm. of ethyl 2-phenyl-4-pentynoate which boiled at 79°–81° at 0.4 mm. 10 gm. of the resulting ester are treated with 100 cc. of 15% ethanolic potassium hydrate, the solution is reflux heated and stirred for 4 hrs. After separation of the solid residue by filtration, the organic filtrate is evaporated to dryness and the residue is taken up with water. After washing with ether the alkaline aqueous suspension is acidified in the cold by dilute acetic acid and extracted with ether.

On evaporation of the ether extracts and fractionation of the oily residue 4.3 gm. of an acid boiling at 89° at 0.2 mm. is obtained.

EXAMPLE 2

Preparation of 2-phenyl-4-pentynoate of β-bromoethyl

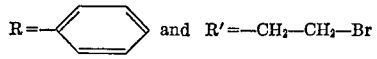

$R=$ and $R'=$—$CH_2$—$CH_2$—Br

To a suspension of 8.2 gm. of 2-phenyl-4-pentynoic acid (0.047 mol) in 60 cc. of carbon tetra chloride is added 23.30 gm. of ethylene bromohydrin (0.188 mol) and 10 drops of concentrated sulphuric acid, followed by reflux heating for 15 hours. After cooling, the reaction mixture is washed with water, with 10% sodium bicarbonate, with water again, and finally dried over anhydrous sodium sulphate. The solvent is evaporated in vacuo and the residue fractionated. 9.7 gm. of a colorless oil boiling at 121–123° at 0.05 mm. were obtained.

EXAMPLE 3

Preparation of 2-phenyl-4-pentynoate of tropine

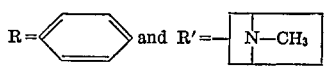

$R=$ and $R'=$ N—$CH_3$ 2.82 gm. of tropine (0.02 mol), 0.78 gm. of potassium (0.002 mol) and 40 cc. of toluol were reflux heated with stirring for 6–7 hours until complete formation of the potassium salt of tropine. To the resulting suspension was added at room temperature a solution in 10 cc. of benzol of 3.85 gm. of 2-phenyl-4-pentynoyl-chloride (0.02 mol); the mixture was reflux heated and stirred for 3 hours. The resulting inorganic salt was separated by filtration, the organic filtrate was washed with water and extracted with 10% dilute hydrochloric acid. After neutralization with bicarbonate of soda the aqueous solution was extracted with ether. The ether solution was dried over anhydrous sodium sulfate and evaporated. The oily residue was fractionated in vacuo, resulting in 1.3 gm. of oily material which boiled at 147–149° C. at 0.7 mm.

EXAMPLE 4

Preparation of iodo-methylate of 2-phenyl-4-pentynoate of tropine 0.6 gm. of tropine 2-phenyl-4-pentynoate and 0.6 gm. of methyl iodide in 3 cc. of methyl alcohol were heated under pressure for 12 hrs. at 70° C.

On cooling the quaternized salt precipitated, was filtered off and purified by crystallization by methanol.

Melts at 243°–244° C.

EXAMPLE 5

Preparation of 2-phenyl-4-pentynoate of di-iso-propyl-amino-ethyl

The mixture of 5.22 gm. of 2-phenyl-4-pentynoic acid (0.03 mol), 1.17 gm. of potassium (0.03 mol) and 4.91 gm. of iso-propyl-amino-ethyl-chloride (0.03 mol) in 60 cc. of absolute isopropanol were reflux heated for 3 hrs.

After filtration the organic filtrate was evaporated, the residue taken up with water and extracted with ether. The ether solution, after washing with water and dilute sodium bicarbonate followed by drying over anhydrous sodium sulphate, was evaporated to dryness and the oily residue was fractioned in vacuo, producing 5.7 gm. of colorless oil which boils at 131° C. at 0.2 mm.

EXAMPLE 6

Preparation of 2-phenyl-4-pentynoate of β-(N-methyl-N'-piperazinile)-ethyl

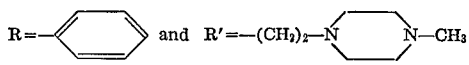

A mixture of 7 gm. of 2-phenyl-4-pentynoate of β-bromoethyl (0.025 mol) and 2.5 gm. of N-methyl-piperazine (0.025 mol) was heated at 130° C. with stirring for 7 hrs. After cooling, the resultant material was taken up with water, the mixture washed with ether, made alkaline in the cold state by solid sodium carbonate and finally extracted with ether.

The ether solution was washed with water until it gave a neutral reaction, dried and evaporated. On fractionation in vacuo of the oily residue there was obtained a colorless fraction which boils at 163–164° C. at 0.15 mm.

The following compounds have been obtained by the general methods described above:

(1) 2-propyl-4-pentynoate of β-diethylaminoethyl.—This product is shown under reference 50268 in the table.

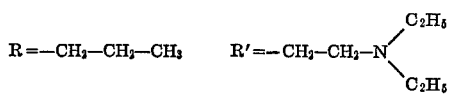

Boiling point 115° at 0.2 mm.

The product was obtained by the general methods A, B and C.

(2) 2-propyl-4-pentynoate of N-ethyl-3-piperidyl.—The product is shown under reference 50268 in the table.

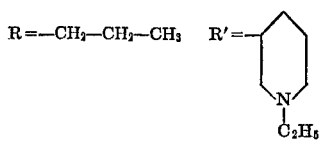

Boiling point 117° at 0.1 mm.

(3) 2-propyl-4-pentynoate of tropine monochlorhydrate.—The product is shown under reference 50229 in the table.

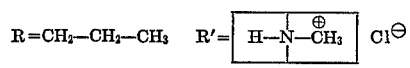

Melting point 207–209°.

The product was obtained by method A and subsequent salification with hydrochloric acid.

(4) 2-phenyl-4-pentynoate of β-diethyl-amino-ethyl.—The product is shown under reference 50268 in the table.

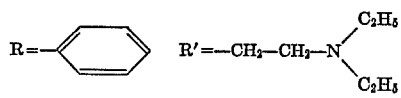

Boiling point 118–119° at 0.1 mm.

The product was obtained by methods A, B and C.

The monochlorhydrate has a melting point of 109–110°.

(5) 2-phenyl-4-pentynoate of N-ethyl-3-piperidyl.—The product is shown under reference 50276 in the table.

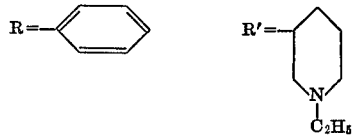

Boiling point 121–123° at 0.1 mm.

The product was obtained by methods A and B.

The monochlorhydrate has a melting point of 147–149°.

(6) 2-phenyl-4-pentynoate of tropine.—The product is shown under reference 50303 in the table.

Boiling point 147–149° at 0.1 mm.

The product was obtained by method A.

The iodomethylate, shown under reference 50303MJ in the table, has a melting point of 243–244°.

(7) 2-phenyl-4-pentynoate of β-di-isopropylamino-ethyl.—The product is shown under reference 50304 in the table.

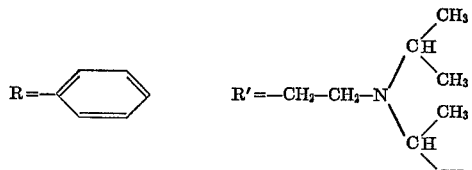

Boiling point 131° at 0.2 mm.

The product was obtained by methods A, B and C.

(8) 2-phenyl-4-pentynoate of γ-diethylamino-β,β-dimethyl propyl.—The product is shown under reference 50302 in the table.

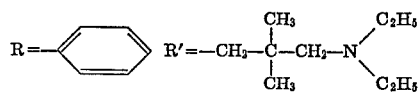

Boiling point 130–132° at 0.25 mm.

The product was obtained by the general methods A and B.

(9) 2-phenyl-4-pentynoate of N-methyl-3-piperdyl-monochlorhydrate.—The product is shown under reference 50307 in the table.

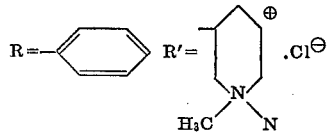

Melting point 185°.

The amino-ester from which the chlorhydrate is derived was obtained by the general methods A and B.

(10) 2-phenyl-4-pentynoate of γ-morphiline-β,β-dimethyl-propyl.—The product is shown under reference 50321 in the table.

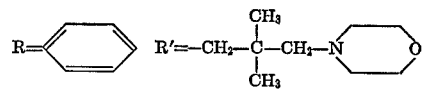

Boiling point 158–159° at 0.15 mm.

The product was obtained by the general methods A and B.

(11) 2-phenyl-4-pentynoate of β-(N-piperazinide)-ethyl.—The product is shown under reference 50314 in the table.

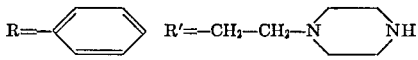

Boiling point 141–145° at 0.1 mm.
The product was obtained by the general method C.
The dichlorhydrate has a melting point 167–169°.

(12) 2-phenyl-4-pentynoate of β-(N-methyl-N'-piperazinyl)-ethyl.—The product is shown under reference 50321 in the table.

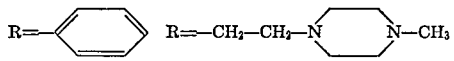

Boiling point 163–164° at 0.15 mm.
The product was obtained by the general methods A, B and C.

(13) N - N' - bis - (2 - phenyl-4-pentynoiloxyethyl)-piperazine. The product is shown under reference 50315 in the table.

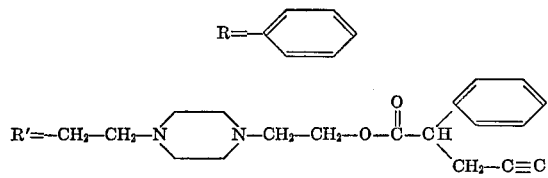

Melting point 111–113°
The product was obtained by the general methods A, B and C.

(14) 2-phenyl-4-pentynoate or 2-(2'-diethylaminoethoxy) ethyl.

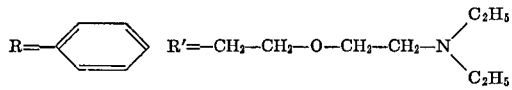

Boiling point 156–8° at 0.5 mm.
The product was obtaned by methods A and C.

While the invention has been illustrated in particular with respect to the production of specific compounds of the invention, it is apparent that variations and modifications of the invention as shown can be made.

What is claimed is:
1. A compound selected from the group consisting of compounds of the formula:

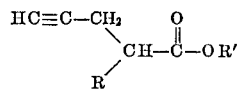

wherein R is selected from the group consisting of

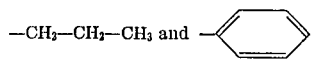

wherein R' is selected from the group consisting of

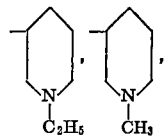

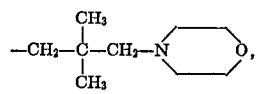

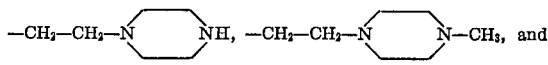

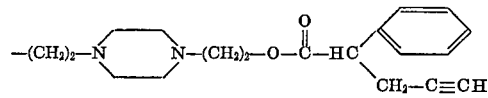

and physiologically acceptable salts thereof.

References Cited

Cerbai et al.: Chem. Abstracts, vol. 71, No. 25, p. 412, item No. 124,001m, Dec. 29, 1969.
Cerbai et al.: Chem. Abstracts, vol. 74, No. 13, p. 287, item. No. 64,025x, Mar. 29, 1971.

ALAN L. ROTMAN, Primary Examiner

U.S. Cl. X.R.

260—268 R, 293.81, 293.88; 292, 469, 482 R; 424—248, 250, 265, 267, 305, 314